(12) United States Patent
Lane

(10) Patent No.: US 6,282,576 B1
(45) Date of Patent: Aug. 28, 2001

(54) METHOD OF TRANSFERRING HETEROGENEOUS DATA WITH MEANINGFUL INTERRELATIONSHIPS BETWEEN INCOMPATIBLE COMPUTERS

(75) Inventor: Andrew Stephen Lane, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/157,892

(22) Filed: Sep. 21, 1998

(51) Int. Cl.[7] .......................... G06F 15/16; G06F 15/173
(52) U.S. Cl. ..................... 709/246; 709/231; 709/236; 707/100
(58) Field of Search .................................. 709/218, 219, 709/246, 250, 200, 231, 236; 712/11, 228, 243, 245; 341/82, 83; 707/100

(56) References Cited

U.S. PATENT DOCUMENTS

| | | | |
|---|---|---|---|
| 5,339,434 | * 8/1994 | Rusis ..................................... | 709/246 |
| 5,379,296 | * 1/1995 | Johnson et al. ....................... | 370/402 |
| 5,539,736 | * 7/1996 | Johnson et al. ....................... | 370/402 |
| 5,657,252 | * 8/1997 | George .................................. | 702/83 |

OTHER PUBLICATIONS

Object–oriented SECS programming system, Wood, E.J., Center for Integrated System, Stanford Univ., Ca, IEEE, Jun. 1992.*

* cited by examiner

*Primary Examiner*—Le Hien Luu
*Assistant Examiner*—Beatriz Prieto
(74) *Attorney, Agent, or Firm*—Charles J. Fassbender; Mark T. Starr; Lise A. Rode

(57) ABSTRACT

Heterogeneous data is transferred from a first computer to a second computer such that a) the data includes multiple data types in respective formats that are native to the first computer but are foreign to the second computer, and b) meaningful interrelationships among the multiple data types are conveyed. This transfer of the heterogeneous data is achieved by a method which includes the steps of: 1) generating, in the first computer, encoded subitems from the heterogeneous data where each subitem has a predetermined code; 2) combining, in the first computer, all of the subitems into a high level tree-shaped structure which has branches and tag fields that indicate various relationships between the subitems; 3) sending the high level structure from the first computer to the second computer; 4) parsing, in the second computer, the encoded subitems from the high level structure; and, 5) translating, in the second computer, each encoded subitem to a different format that is native to the second computer, based on the predetermined code.

11 Claims, 6 Drawing Sheets

X86 WORD INTEGER 41

15 ──TWO'S COMPLEMENT── 0

X86 PACKED DECIMAL 42

D17 • • • • • • • • • • • D0

71 ────── DIGITS ────── 0

SIGN=BIT 79

X86 SINGLE PRECISION 43

23 ──MANTISA── 0

BIASED EXPONENT=BITS 30-24

SIGN=BIT 31

A-SERIES WORD INTEGER 41'

51  38 ──── MAGNITUDE ──── 0

SIGN=BIT 46
TAG=BITS 51-48

A-SERIES PACKED DECIMAL 42'

NONE

A-SERIES SINGLE PRECISION 43'

51  38 ──── MANTISA ──── 0

EXPONENT=BITS 44-39
EXP. SIGN=45
MAN. SIGN=46
TAG=51-48

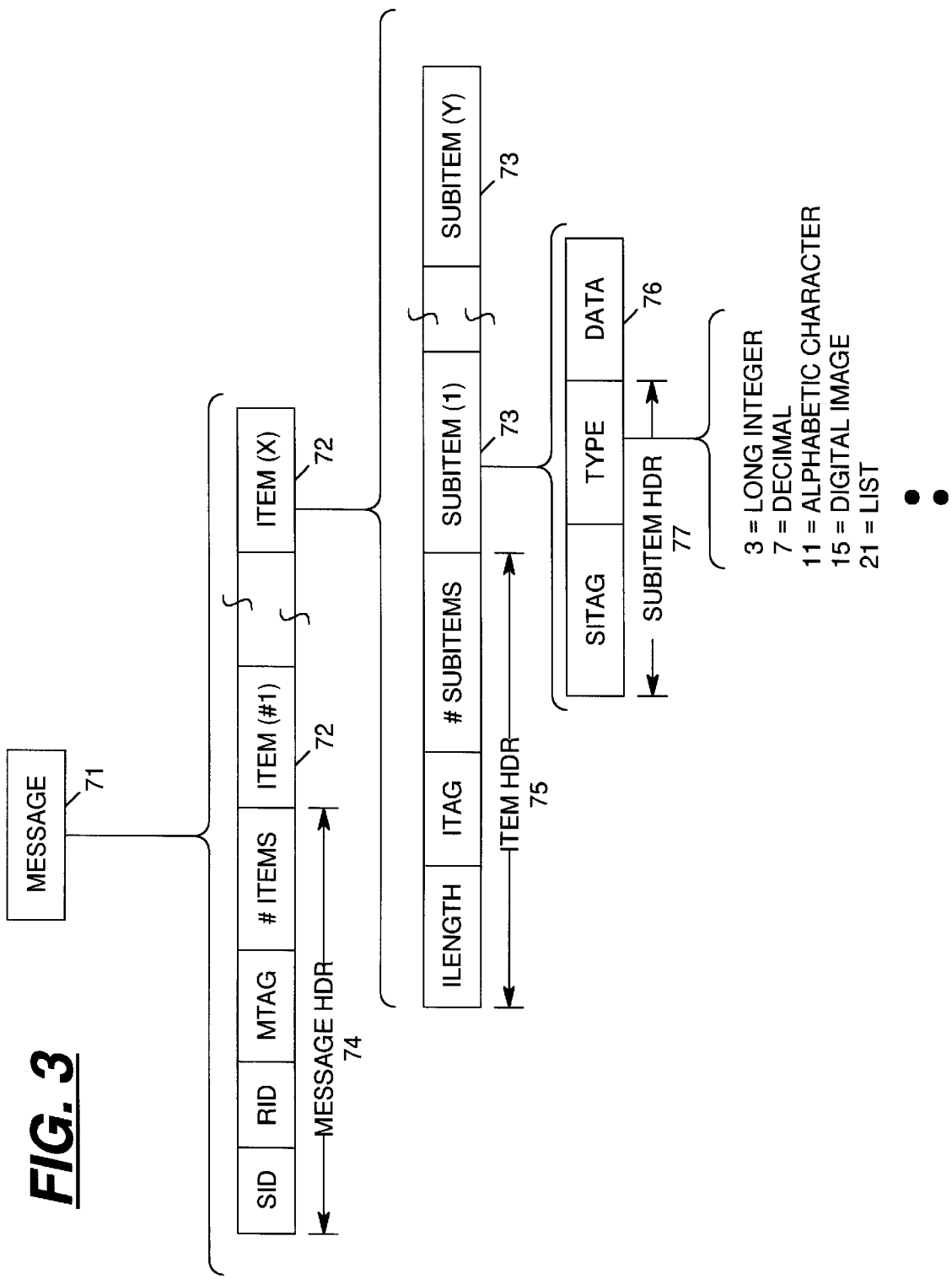

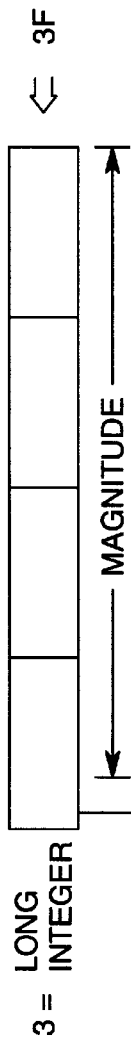
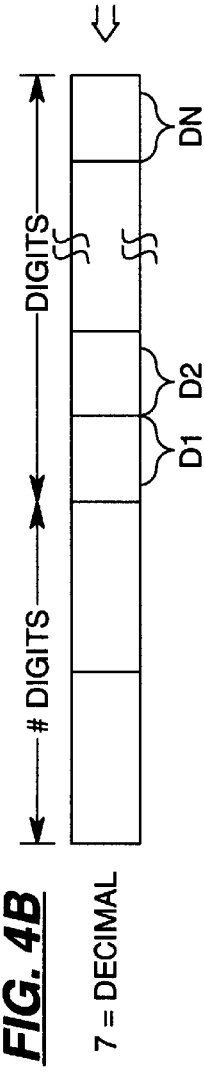
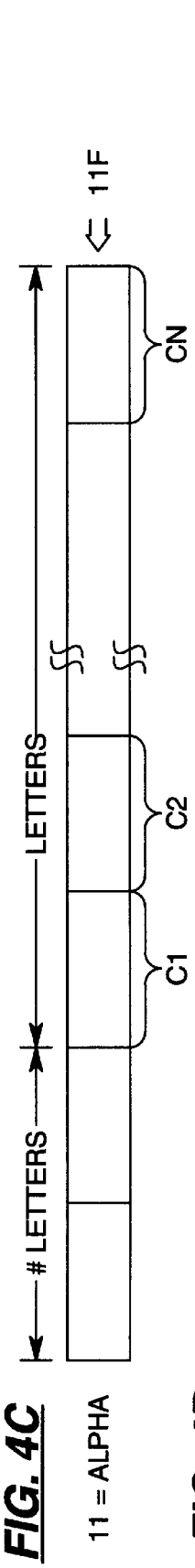
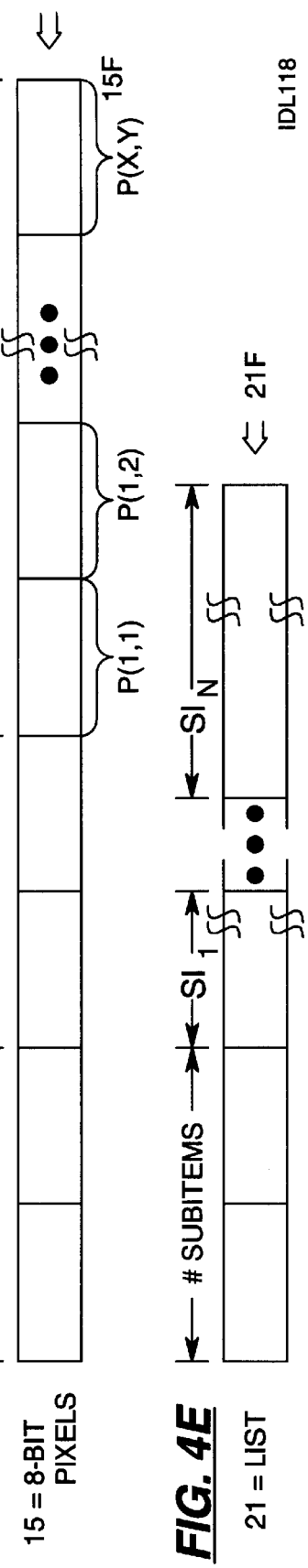
FIG. 4A
3 = LONG INTEGER
FIG. 4B
7 = DECIMAL
FIG. 4C
11 = ALPHA
FIG. 4D
15 = 8-BIT PIXELS
FIG. 4E
21 = LIST

METHOD OF TRANSFERRING HETEROGENEOUS DATA WITH MEANINGFUL INTERRELATIONSHIPS BETWEEN INCOMPATIBLE COMPUTERS

BACKGROUND OF THE INVENTION

This invention relates to methods of transferring multiple types of heterogeneous data from a first computer to a second computer such that the multiple data types have meaningful interrelationships and are in respective formats that are native to the first computer but are foreign to the second computer.

In the prior art, many different models of digital computers have been designed and sold by dozens of corporations without any common standards on the computer's internal operation. Consequently, a computer from any one corporation usually is completely incompatible with the computers from all other corporations.

For example, the X86 personal computers from Intel Corporation and the A-Series computers from Unisys Corporation execute respective sets of object code instructions which are totally different from each other. Thus any program which is a compilation of A-Series object code instructions cannot be executed directly by an X86 computer; and, any program which is a compilation of X86 object code instructions cannot be executed directly by an A-Series computer.

Similarly, the X86 personal computers and the A-Series computers operate on respective types of heterogeneous data which have formats that are native to one computer but completely foreign to the other computer. For example, the X86 "word integer," and the X86 "packed decimal" numbers, and the X86 "single precision" numbers have respective formats which are not recognized by the A-Series computers.

Due to the above differences, a major problem of incompatibility arises when a computer which is designed by one corporation attempts to send multiple types of heterogeneous data, with meaningful interrelationships, over a communication channel to a computer which is designed by another corporation. For example, if an X86 computer sends a series of X86 alphabetic characters and X86 decimal digits to an A-Series computer, those characters and digits will not even be recognized by the A-Series computer. Further, no universal mechanism exists whereby the X86 computer can attach various meaningful interrelationships between the characters and the digits that it sends to be A-Series computer.

What is needed, and what is lacking in the prior art, is a universal method of transferring multiple types of heterogeneous data from one computer to any other incompatible computer such that the receiving computer can recognize each of the different data types and can also recognize various meaningful relationships between the data types. Accordingly, a primary object of the present invention is to provide a novel method which fulfills the above need.

BRIEF SUMMARY OF THE INVENTION

With the present invention, a method of transferring heterogeneous data from a first computer to a second computer is provided such that a) the data can include multiple data types in respective formats that are native to the first computer but are foreign to the second computer, and b) meaningful interrelationships among the multiple data types can be conveyed. This method includes the steps of: 1) generating, in the first computer, encoded subitems from the heterogeneous data where each subitem has a predetermined code; 2) combining, in the first computer, all of the subitems into a high level tree-shaped structure which has branches and tag fields that indicate various relationships between the subitems; 3) sending the high level structure from the first computer to the second computer; 4) parsing, in the second computer, the encoded subitems from the high level structure; and, 5) translating, in the second computer, each encoded subitem to a different format that is native to the second computer, based on the predetermined code.

In one embodiment, the high level tree-shaped structure is comprised of a single message which has branches to a selectable number of items, and each item has branches to a selectable number of the encoded subitems. Preferably, the single message includes a message-header that is followed by a concatenation of all of the items to which the message has branches; each particular item includes a respective item-header that is followed by all of the encoded subitems to which that particular item has branches; and each encoded subitem includes a respective subitem-header that contains the predetermined code and is followed by a portion of the heterogeneous data. Also preferably, the message-header includes a tag field in which said first computer can insert information regarding the meaning of the message as a whole; each item-header includes a tag field in which the first computer can insert information regarding the meaning of the corresponding items; and each subitem-header includes a tag field in which the first computer can insert information regarding the meaning of the subitem.

BRIEF DESCRIPTION OF THE DRAWINGS

FIG. 3 shows a high level structure which is generated by the X86 and A-Series computers of FIG. 1, in accordance with the present invention, as a means for transferring several types of heterogeneous data with meaningful interrelationships to each other.

FIGS. 4A–4E (herein collectively referred to as FIG. 4) shows an example of how several different types of heterogeneous data are incorporated into the high level structure of FIG. 3.

DETAILED DESCRIPTION

Figure 1:
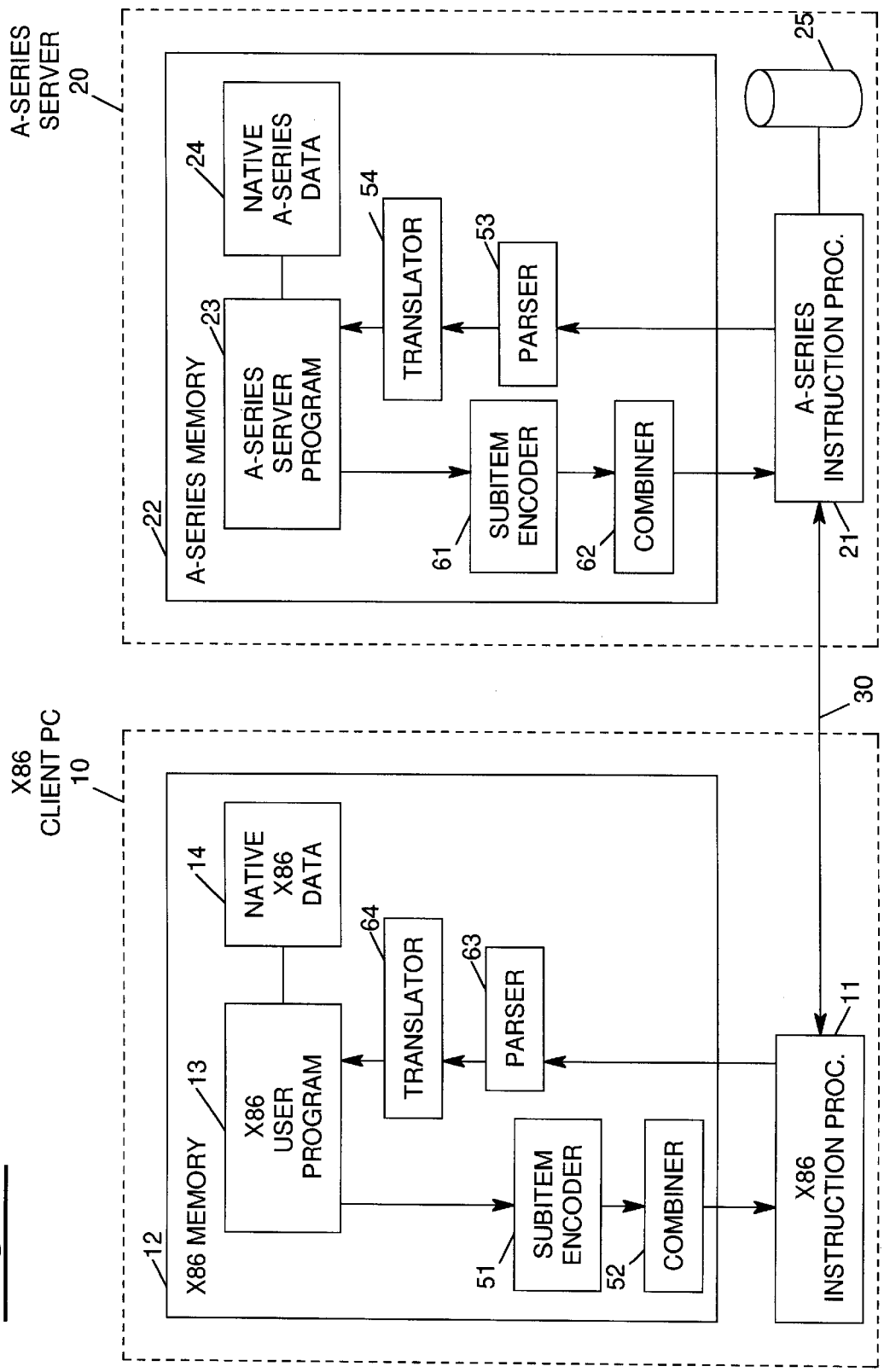
FIG. 1 shows one preferred embodiment of a computer system which operates in accordance with the present invention.
Figure 2A:
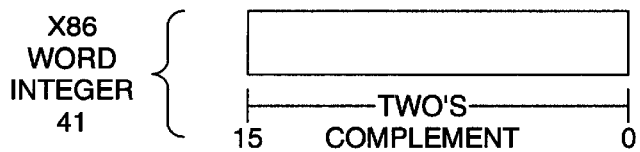
FIGS. 2A–2F (herein collectively referred to as FIG. 2) shows three data types and their respective formats which are native to an X86 instruction processor in FIG. 1, and three data types and their formats which are native to an A-Series instruction processor in FIG. 1.
Figure 2B:
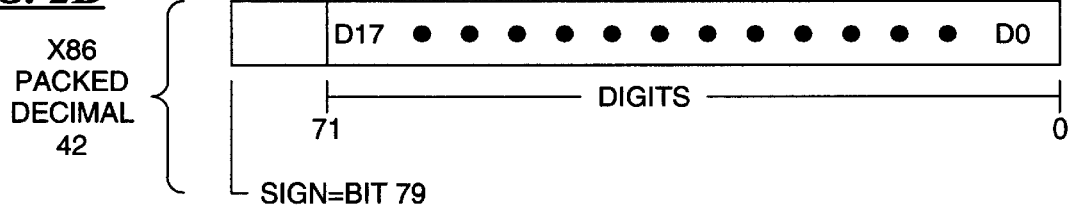
Figure 2C:
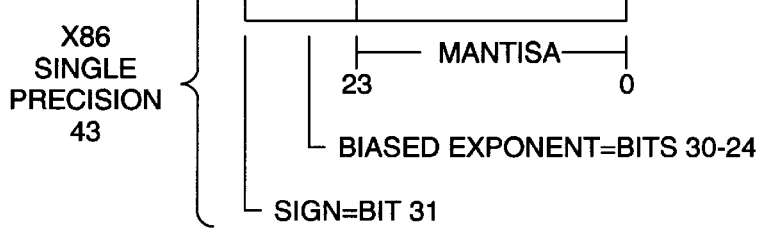
Figure 2D:
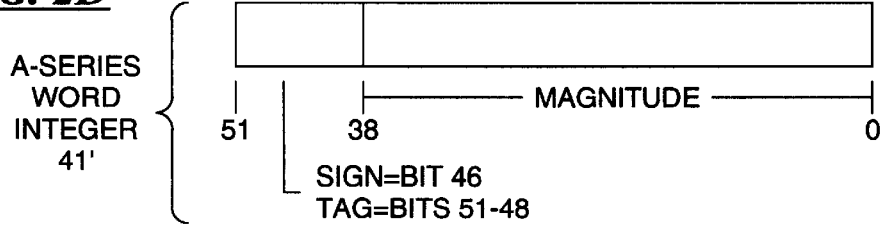
Figure 2E:
Figure 2F:
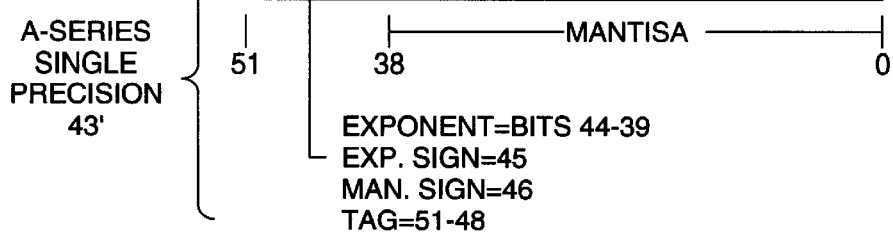

With reference now to FIG. 1, a preferred embodiment of a computer system which operates in accordance with the present invention will be described in detail. This FIG. 1 embodiment is comprised of an X86 personal computer 10 and an A-Series server computer 20 which are intercoupled to each other by a communication channel 30.

Included within the X86 personal computer 10 is an X86 instruction processor 11 and an X86 memory 12. The X86 instruction processor 11 directly executes X86 object code instructions; and the X86 memory 12 stores programs which are compilations of the X86 object code instructions. Examples of the X86 instruction processor are the Intel 386 processor, the Intel 486 processor, the Intel Pentium processor, the Intel Merced processor, and any other processor which has a compatible set of object code instructions.

Various types of heterogeneous data which are native to the X86 instruction processor 11 are also stored in the X86 memory 12. For example, FIG. 1 shows that the X86 memory 12 stores an X86 user program 13 which is a compilation of hundreds of the X86 object code instructions; and that program 13 operates on heterogeneous data 14, stored in the X86 memory 12, which is native to the X86 instruction processor 11. This heterogeneous data 14 is native to the X86 instruction processor 11 because it consists of multiple data types in respective formats that are recognized by the X86 object code instructions.

Three specific data types, and their respective formats which are native to the X86 instruction processor 11, are shown in FIG. 2. Format 41 is for a word integer; format 42 is for packed binary coded decimal data; and format 43 is for a single precision real number. These formats 41, 42 and 43 respectively are sixteen bits long, eighty bits long, and thirty-two long; and the meaning of each bit is indicated in FIG. 2. Additional data types and their respective formats which are native to the X86 instruction processor can be found in many X86 user manuals from Intel Corporation.

Similarly, the A-Series server computer 20 includes an A-Series instruction processor 21 and an A-Series memory 22. The A-Series instruction processor 21 directly executes A-Series object code instructions; and the A-Series memory 22 stores programs which are compilations of the A-Series object code instructions. Examples of the A-Series instruction processor are the Unisys A7 processor, the Unisys A11 processor, the Unisys A16 processor, and any other processor which has a compatible set of object code instructions.

Various types of heterogeneous data which are native to the A-Series instruction processor 21 are also stored in the A-Series memory 22. For example, FIG. 1 shows that the A-Series memory 22 stores an A-Series server program 23 which is a compilation of hundreds of A-Series object code instructions; and that program 23 operates on heterogeneous data 24, stored in the A-Series memory 22, which is native to the A-Series instruction processor 21. This heterogeneous data 24 is native to the A-Series instruction processor 21 because it consists of multiple data types in respective formats that are recognized by the A-Series object code instructions.

Three specific data types, and their respective formats which are native to the A-Series instruction processor 21, are shown in FIG. 2. Format 41' is for a word integer; format 42' is for packed binary coded decimal data; and format 43' is for a single precision real number. By comparing these A-Series formats 41', 42', and 43' with the X86 formats 41, 42, and 43, many substantial differences between them can be seen.

For example, the X86 word integer 41 is sixteen bits long and is in two's-complement form; whereas the A-Series word integer 41' is fifty-two bits long and is in a sign-and-magnitude form. Likewise, the X86 packed decimal number 42 is eighty bits long and includes eighteen binary coded decimal digits D17-D0; whereas the A-Series instruction processor 21 does not recognize any decimal data format. Further, the X86 single precision data 43 is thirty-two bits long and includes a twenty-four-bit mantissa and a seven-bit biased exponent; whereas the A-Series single precision data 43' is fifty-two bits long and includes a thirty-nine bit mantissa with a five bit unbiased exponent and four tag bits.

Now, in accordance with the present invention, the X86 memory 12 in FIG. 1 stores a subitem encoder program 51 and a combiner program 52; and the A-Series memory 22 in FIG. 1 stores a parser program 53 and a translator program 54. These four programs 51–54 operate together to transfer heterogeneous data with meaningful relationships from the X86 computer 10 to the A-Series computer 20, even though that heterogeneous data includes multiple data types in respective formats that are native to the X86 computer but are foreign to the A-Series computer.

In the subitem encoder program 51, heterogeneous data which is native to the X86 instruction processor is encoded into subitems such that each subitem has a predetermined code. In the combiner program 52, the encoded subitems are combined into a high level structure which indicates various relationships between all of the subitems. That high level structure is then sent over the communication channel 30 to the parser program 53.

In the parser program 53, the encoded subitems are separated from the high level structure. Then, in the translator program 54, each encoded subitem is translated based on its predetermined code to a format that is native to the A-Series instruction processor 21. That translated data is then processed by the A-Series server program 23 and the A-Series instruction processor 21 based on the relationships which are indicated by the high level structure.

Similarly, in accordance with the present invention, the A-Series memory 22 in FIG. 1 stores a subitem encoder program 61 and a combiner program 62; and the X86 memory 12 in FIG. 1 stores a parser program 63 and a translator program 64. These four programs 61–64 operate together to transfer heterogeneous data with meaningful relationships from the A-Series computer 20 to the X86 computer 10, even though that heterogeneous data includes multiple data types in respective formats that are native to the A-Series computer but are foreign to the X86 computer.

In the subitem encoder program 61, heterogeneous data which is native to the A-Series instruction processor 21 is encoded into subitems such that each subitem has a predetermined code. In the combiner program 62, the encoded subitems are combined into a high level structure which indicates various relationships between those subitems. That the high level structure is then sent over the communication channel 30 to the parser program 63.

In the parser program 63, the encoded subitems are separated from the high level structure. Then, in the translator program 64, each encoded subitem is translated based on its predetermined code to a format that is native to the X86 instruction processor 11. That translated data is then processed by the X86 user program 13 and the X86 instruction processor 11 based on the relationships which are indicated by the high level structure.

Turning now to FIG. 3, the make-up of the high level structure which is generated by the combiner programs 52 and 62 will be described. This high level structure in FIG. 3 is tree-shaped, and it is comprised of a single message 71 which has branches to a selectable number of items 72. Further in the high level structure of FIG. 3, each item 72 has branches to a selectable number of subitems 73.

Included in the message 71 is a MESSAGE HEADER 74 which has several fields that are labeled SID, RID, MTAG, and #ITEMS. Field SID is a two-byte binary field which identifies the source of the message; and field RID is a two-byte binary field which identifies a receiver for the message. Field MTAG is a six-byte binary field which can be filled in any fashion by the sender of the message to express the meaning of the message to its receiver. Field #ITEMS is a four-byte binary field that specifies the total number of items 72 to which the message 71 has branches.

Included in each item 72 is an ITEM HEADER 75 which has several fields that are labeled ILENGTH, ITAG and number #SUBITEMS. Field ILENGTH is a four-byte binary field which specifies the length of the item. Field ITAG is a six-byte binary field which can be filled in any fashion by the sender of the message to express the meaning of the item to its receiver. Field #SUBITEMS is a two-byte binary field that specifies the total number of subitems to which the corresponding item 72 has branches.

Each subitem 73 is comprised of DATA 76 and a SUB-ITEM HEADER 77 which contains a SITAG field and a TYPE field. This TYPE field is a one-byte field which contains a predetermined code that identifies the type and format of the DATA 76; and the SITAG field is a two-byte field which can be filled in any fashion by the sender of the message to express the meaning of the DATA to its receiver.

Several specific examples of how the DATA 76 can be encoded by the TYPE field in the SUBITEM HEADER 77 is shown in FIG. 4. There, a code of "3" indicates that the corresponding DATA 76 is a long integer with a format 3F. Similarly, a TYPE code of "7" indicates that the corresponding DATA 76 is a decimal number with format 7F; a TYPE code of "11" indicates that the corresponding DATA 76 is a string of alphabetic characters with a format 11F; a TYPE code of "15" indicates that the corresponding DATA 76 is a digital image with a format 15F; and a TYPE code of "21" indicates that the corresponding DATA 76 is a list of subitems 74 with a format 21F.

All of the details of the various DATA formats, 3F, 7F, 11F, 15F, and 21F are shown in FIG. 4. When the TYPE code in the SUBITEM HEADER 77 is "3," the corresponding DATA is four bytes long. The left most bit gives the sign of the DATA, and the remaining bits give the magnitude of the DATA.

When the TYPE code in the SUBITEM HEADER 77 is a "7," the corresponding DATA includes a series of decimal digits D1-DN. These digits are preceded by a two-byte binary number which specifies the total number of digits in the series.

When the TYPE code in the SUBITEM HEADER 77 is "11," the corresponding DATA includes a series of letters C1-CN from a predetermined alphabet. Each letter occupies one byte, and the total number of letters in the series is specified by a two-byte binary number which immediately precedes the letters.

When the TYPE code in the SUBITEM HEADER 77 is "15," the corresponding DATA includes a series of 8-bit pixels which form a digital image. Each pixel occupies one byte, and the pixels are ordered in rows and columns. Four bytes which immediately precede the pixels specify the number of pixels per row and the number of pixels per column.

When the TYPE code in the SUBITEM HEADER 77 is "21," the corresponding DATA is a list of several other subitems $SI_1$–$SI_N$. Each subitem includes DATA 76 and a SUBITEM HEADER 77 as shown in FIG. 3, and the total number of subitems is specified by a binary number in two bytes which immediately precede the first SUBITEM $SI_1$.

Now, with reference to FIG. 5, a specific example will be described which illustrates how the high level structure of FIG. 3 and the various encoded subitems of FIG. 4 are utilized to send messages from the X86 computer 10 of FIG. 1 to the A-Series computer 20. In this FIG. 5 example, a message $M_1$ is sent from the X86 user program 13 to the A-Series server program 23, and that message $M_1$ constitutes a request to receive the personal record for a particular employee named John Doe who has an employee ID number 6798.

Figure 5:
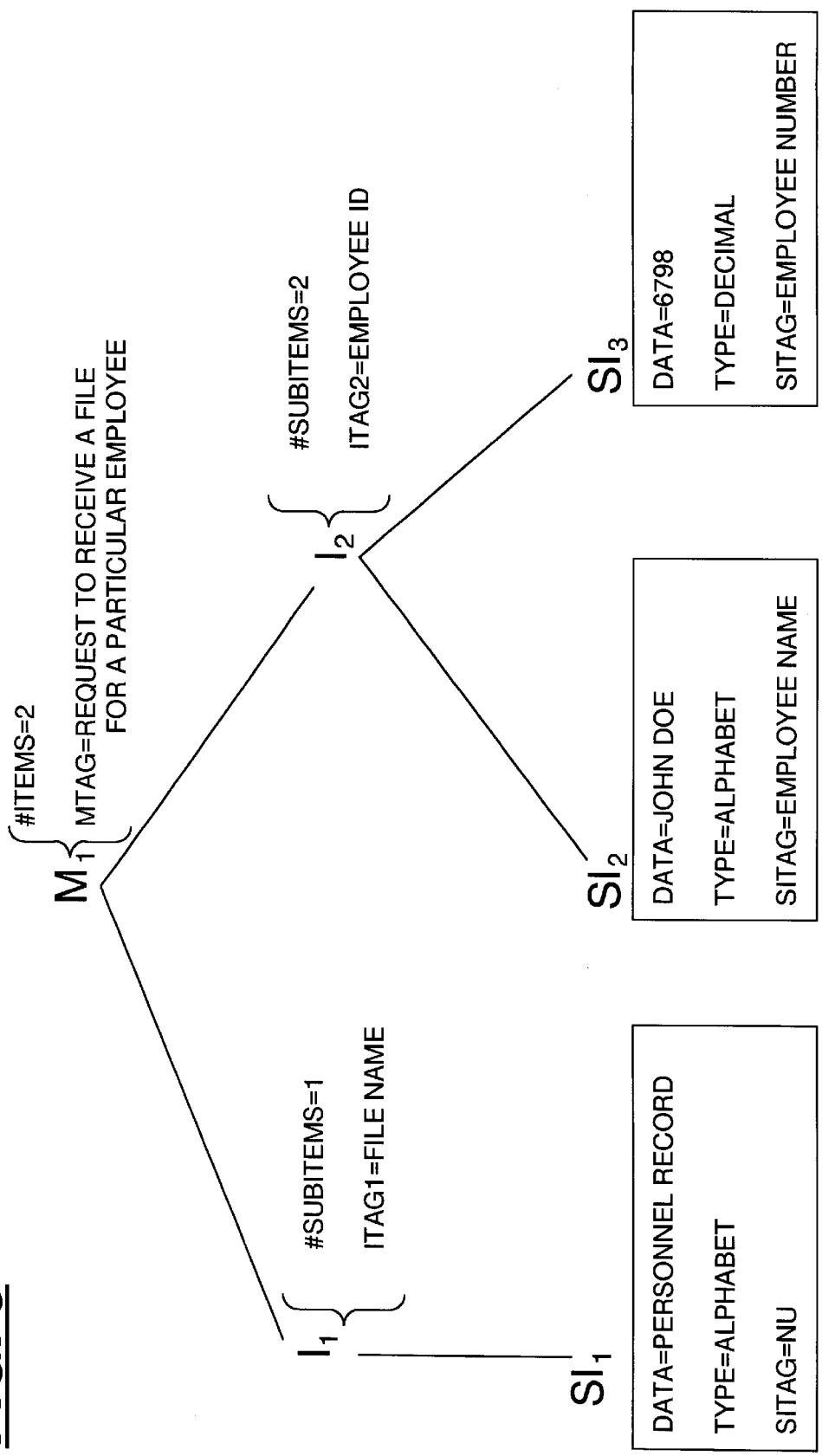
FIG. 5 shows an example of how the high level structure of FIG. 3 is used by the X86 computer of FIG. 1 to transfer several heterogeneous data types with meaningful interrelationships to the A-Series computer.

In FIG. 5, the message $M_1$ has two branches to items $I_1$ and $I_2$. To indicate that the message $M_1$ has branches to the items $I_1$ and $I_2$, the field #ITEMS in the MESSAGE HEADER 73 is set equal to two. Also, item $I_1$ has a branch to a single subitem $SI_1$ and item $I_2$ has two branches to subitems $SI_2$ and $SI_3$. To indicate that item $I_1$ has a branch to just a single subitem, the field #SUBITEMS in the HEADER 75 of item $I_1$ is set equal to one; and to indicate item $I_2$ has branches to two subitems, the field #SUBITEMS in the HEADER 75 of item $I_2$ is set equal to two.

To attach particular meanings to the various parts of the message $M_1$, the fields MTAG and ITAG and SITAG are used. For example, the MTAG field indicates that the message as a whole is a request to receive a file on a particular employee.

In the first item $I_1$, the ITAG field indicates that item $I_1$ names the file that is requested. Then, the TYPE field for subitem $SI_1$ indicates that the subitem DATA field contains alphabetic characters; and the DATA field for subitem SI actually names the requested file by spelling the words "personnel record".

In the second item $I_2$, the ITAG field indicates that the item $I_2$ identifies the particular employee whose personnel record is being requested. Then, the TYPE field of subitem $SI_2$ indicates that the corresponding subitem DATA field contains alphabetic characters; the SITAG field indicates that the alphabetic characters specify the employee's name; and the DATA field actually provides the employee's name. Likewise, the TYPE field of subitem $SI_3$ indicates that the corresponding subitem DATA field is decimal data; the SITAG field indicates that the decimal data is the employee's number; and the DATA field actually specifies the employee's number as 6798.

When the FIG. 5 message $M_1$ is received by the A-Series computer 20, that message is processed by the parser program 53 and the translator program 54. In the parser program 53, each of the items and subitems are separated from the message. Then in the translator program 54, the DATA fields in the subitems are translated to formats that are native to the A-Series instruction processor 21. This translation is made possible because the TYPE code of each subitem identifies the DATA as being decimal, alphabetic, etc.; and it also identifies the particular format in which that DATA is sent.

Following the above steps, the A-Series server program 23 uses the translated DATA fields to obtain the requested file from a database which is stored in a disk 25. Then, the requested file is sent from the A-Series computer 20 to the X86 computer 10 via a message $M_2$ which is shown in FIG. 6.

Figure 6:
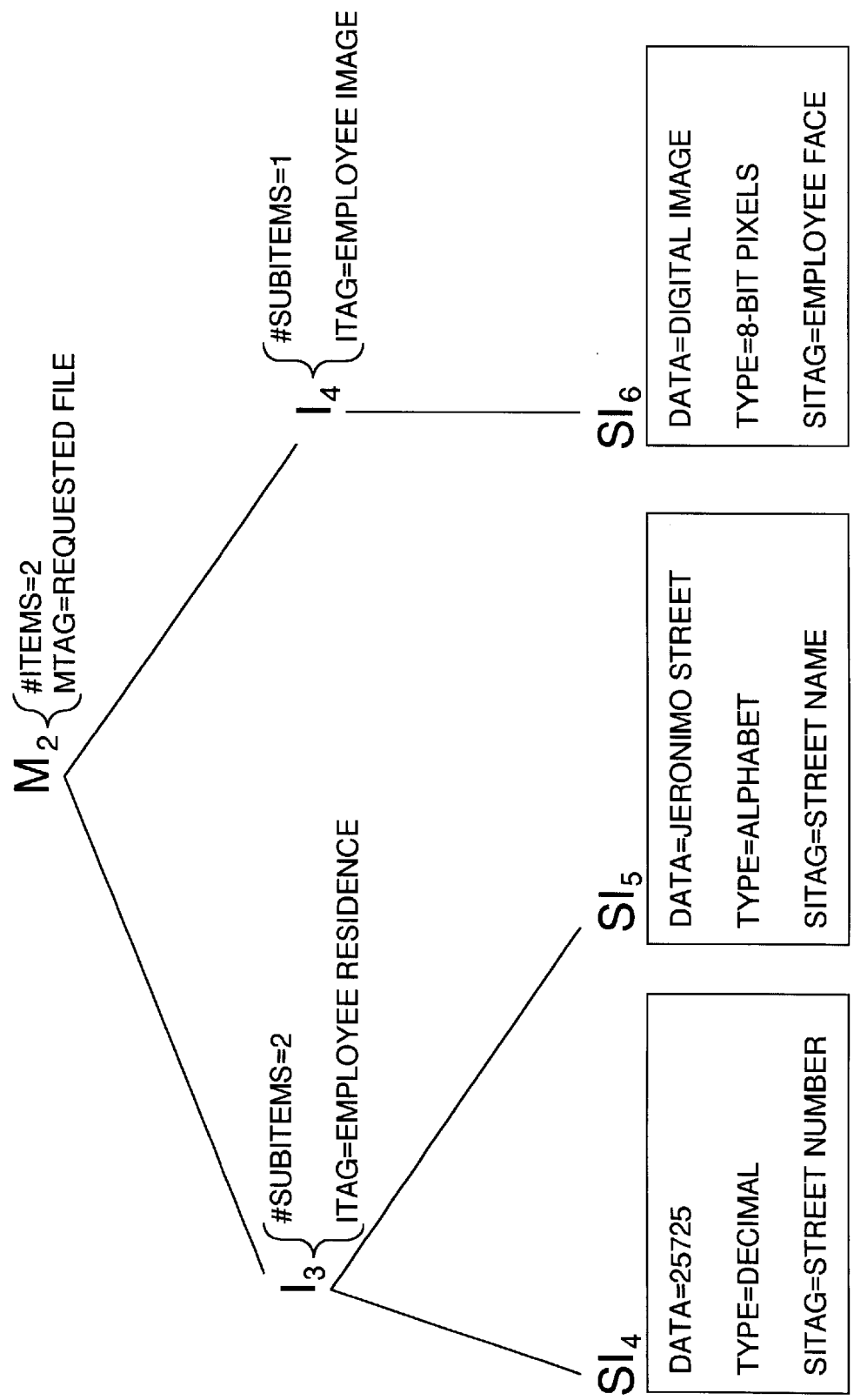
FIG. 6 shows an example of how the high level structure of FIG. 3 is used by the A-Series computer of FIG. 1 to transfer several heterogeneous data types with meaningful interrelationships to the X86 computer.

In FIG. 6, the message $M_2$ has branches to two items $I_3$ and $I_4$. To indicate that the message $M_2$ has branches to the items $I_3$ and $I_4$, the field #ITEMS in the message header 73 is set equal to two. Also, item $I_3$ has branches to two subitems $SI_4$ and $SI_5$; and item $I_4$ has a branch to a single subitem $SI_6$. To indicate that item $I_3$ has branches to two subitems, the field #SUBITEMS in the header 75 of item $I_3$ is set equal to two; and to indicate that item $I_4$ has a branch to just a single subitem, the field #SUBITEMS in the header 75 of item $I_4$ is set equal to one.

To attach particular meanings to the various parts of the message $M_2$, the fields MTAG and ITAG and SITAG are used. For example, the MTAG field indicates that the message as a whole contains a requested file.

In the item $I_3$, the ITAG field indicate that item $I_3$ identifies a particular employee's residence. Then, the TYPE field of subitem $SI_4$ indicates that the corresponding subitem DATA field contains decimal data; the SITAG field indicates that the decimal data is a street address; and the DATA field specifies the actual street address. Likewise, the TYPE field of subitem $SI_5$ indicates that the corresponding subitem DATA field contains alphabetic characters; the SITAG field indicates that the characters specify a street name; and the DATA field provides the actual street name.

In the item $I_4$, the TAG field indicates that the item provides a digital image of the employee. Then, the TYPE field for subitem $SI_6$ indicates that the DATA field contains a series of 8-bit pixels; the SITAG fields indicates that those pixels form the image of the employee's face; and the DATA field provides the actual 8-bit pixels.

When the FIG. 6 message $M_2$ is received by the X86 computer 10, that message is processed by the parser program 63 and the translator program 64. In the parser program 63, each of the items and subitems are separated from the message. Then in the translator program 64, the DATA fields in the subitems are translated to formats that are native to the X86 instruction processor 11. This translation is made possible because the TYPE code of each subitem identifies the DATA as being decimal, alphabetic, etc.; and it also identifies the particular format in which that DATA is sent. After the DATA fields are translated to the native X86 format, the X86 program 13 can use the translated DATA fields in any fashion.

One preferred embodiment of a computer system which operates in accordance with the present invention has now been described in detail. In addition however, various modifications can be made to the details of this preferred embodiment without departing from the nature and spirit of the invention. For example, the X86 computer 10 in FIG. 1 and the A-Series computer 20 in FIG. 1 can be replaced with any two computers which are incompatible in the sense that their object code instructions operate on respective types of heterogeneous data which have formats that are native to one of the computers but are foreign to the other computer. Also, as another modification, the TYPE field in the high level structure of FIG. 3 can be changed to include any number of codes, where each code indicates that the corresponding DATA field is a particular type of heterogeneous data in a particular format.

Accordingly, it is to be understood that the present invention is not limited to just the one preferred embodiment, but is defined by the appended claims.

What is claimed is:

1. A method of transferring heterogeneous data from a first computer to a second computer, where said heterogeneous data includes multiple data types in respective formats that are native to said first computer but are foreign to said second computer; said method including the steps of:

generating, in said first computer, encoded subitems from said heterogeneous data such that each subitem has a predetermined code;

combining, in said first computer, all of said subitems into a high level tree-shared message which has branches to a selectable number of items with each item having branches to a selectable number of subitems, where said message is comprised of a message header that is followed by a concatenation of all of said items to which said message has branches, and where each particular item is comprised of a respective item-header that is followed by all of said encoded subitems to which that particular item has branches;

sending said high level tree-shaped message from said first computer to said second computer;

parsing, in said second computer, said encoded subitems from said high level tree-shaped message; and, translating, in said second computer, each encoded subitem to a different format that is native to said second computer, based on said predetermined code.

2. A method according to claim 1 wherein said message-header includes a field which indicates the total number of items to which said message has branches, and each item-header includes another field which indicates the total number of encoded subitems to which the corresponding item has branches.

3. A method according to claim 1 wherein said message-header includes a blank field in which said first computer can insert information regarding said message, and each item-header includes a blank field in which said first computer can insert information regarding the corresponding items.

4. A method according to claim 1 wherein said message-header includes a field which identifies said message as a request for information from a data base, and each item-header includes a field which indicates that the corresponding items are pointers to the requested information in said data base.

5. A method according to claim 1 wherein said message-header includes a field which identifies said message as containing information from a data base, and each item-header includes a field which specifies particular attributes of the corresponding items.

6. A method according to claim 1 wherein each encoded subitem is comprised of a respective subitem-header that is followed by a portion of said heterogeneous data, and each subitem header includes a field which contains said predetermined code.

7. A method according to claim 6 wherein said predetermined code in said subitem header has one particular value which indicates that the corresponding subitem has a recursive structure that can repeat any number of times.

8. A method according to claim 6 wherein said predetermined code in said subitem header indicates whether the corresponding subitem has a fixed length or a variable length and said subitem header includes a field which indicates the magnitude of said variable length.

9. A method according to claim 6 wherein said subitem-header includes a blank field in which said first computer can insert information regarding said subitem.

10. A method according to claim 1 wherein said native format in said first computer of said multiple data types is a X86 data format, and said native format in said sacond computer of said multiple data types is an A-Series data format.

11. A method according to claim 1 wherein said native format in said first computer of said multiple data types is an A-Series data format, and said native format in said second computer of said multiple data types is an X86 data format.

* * * * *